US008113257B2

(12) United States Patent
Austermeier

(10) Patent No.: US 8,113,257 B2
(45) Date of Patent: Feb. 14, 2012

(54) METHOD AND DEVICE FOR THE MULTI-LANE APPLICATION OF LABELS

(75) Inventor: Georg Austermeier, Hovelhof (DE)

(73) Assignee: Mulivac Marking & Inspection GmbH & Co. KG (DE)

( * ) Notice: Subject to any disclaimer, the term of this patent is extended or adjusted under 35 U.S.C. 154(b) by 758 days.

(21) Appl. No.: 12/053,777

(22) Filed: Mar. 24, 2008

(65) Prior Publication Data

US 2009/0020223 A1 Jan. 22, 2009

(30) Foreign Application Priority Data

Jul. 17, 2007 (DE) ......................... 10 2007 033 628

(51) Int. Cl.
*B29C 65/00* (2006.01)

(52) U.S. Cl. ........................................ 156/538; 156/249

(58) Field of Classification Search .................. 156/249, 156/538
See application file for complete search history.

(56) References Cited

U.S. PATENT DOCUMENTS

| | | | | |
|---|---|---|---|---|
| 4,210,484 A | | 7/1980 | Crankshaw et al. | |
| 5,399,228 A | * | 3/1995 | Schroeder et al. | 156/542 |
| 5,725,717 A | * | 3/1998 | Harte et al. | 156/299 |

FOREIGN PATENT DOCUMENTS

| | | | |
|---|---|---|---|
| DE | 76 32 880 | U1 | 2/1977 |
| DE | 2647556 | A1 | 4/1978 |
| DE | 30 19 506 | C2 | 12/1983 |
| DE | 29918313 | U1 | 1/2000 |
| DE | 197 37 458 | C2 | 8/2000 |
| DE | 10228243 | A1 | 1/2004 |
| EP | 0 073 126 | B1 | 3/1983 |
| JP | 63-062421 | B2 | 12/1988 |
| JP | 2784487 | B2 | 5/1998 |

OTHER PUBLICATIONS

International Search Report Dated Oct. 21, 2008, Applicant MR Etikettiertechnik GmbH & CO. KG, Application No. PCT/EP2008/005529, 14 Pages.

Notification Concerning Transmittal of International Preliminary Report on Patentability Dated Jan. 28, 2010, Applicant MR Etikettiertechnik GmbH 7 CO. KG et al., 4 Pages.

Notification of Transmittal of Translation of the International Preliminary Report on Patentability Dated Feb. 18, 2010, Applicant MR Etikettiertechnik GmbH & CO. KG et al., 7 Pages.

* cited by examiner

*Primary Examiner* — Yogendra Gupta
*Assistant Examiner* — John Robitaille
(74) *Attorney, Agent, or Firm* — Brooks Kushman P.C

(57) ABSTRACT

A method and device for the multi-lane and multi-row application of labels on articles such as packages or the like, which are guided in parallel lanes, in which the labels are dispensed from a backing film by a label dispenser, taken up by a conveyor belt, which is guided transversely over the lanes and transferred by a transfer device from the conveyor belt onto the articles. The labels are transferred in consecutive rows from the conveyor belt to a section of a transfer belt which extends transversely to the conveyor belt over and beyond the lanes, until a set with a specified number of label rows on this transfer belt section is completed and the transfer belt, during an advance of the lanes, is driven to dispense the set of label rows onto the articles.

14 Claims, 5 Drawing Sheets

METHOD AND DEVICE FOR THE MULTI-LANE APPLICATION OF LABELS

BACKGROUND OF THE INVENTION

The present invention relates to a method for the multi-lane and multi-row application of labels on articles such as packages or the like, as well as to a device for implementing the method.

The labeling of articles, such as thermoformed packages, with the help of transverse lane labeling systems, is well known. The articles are guided here in parallel lanes, while the labels are dispensed with the help of a label dispenser from a backing film, which is disposed at the side of the lanes. The labels are then taken up by a conveyor belt, which is passed transversely over the lanes.

The labels are transferred from the conveyor belt to the articles by a suitable transfer device. For example, German patent DE 26 47 556 discloses a method, which has long been known and for which in each case a row of labels, which are taken up from the conveyor belt and kept in readiness over the lanes, are pressed downward by a pusher onto the articles or the packing film. Newer labeling systems, such as those shown, for example, in DE 102 28 243 or in DE 299 18 313, comprise a suction box, which is disposed over the conveyor belt and aspirates the labels, taken up at its underside, through openings in the conveyor belt with the help of reduced pressure.

With this construction, a high labeling output for multi-row packaging formats can be achieved only owing to the fact that the labeling unit of conveyor belt, suction box and label dispenser, after a row of labels is transferred from the conveyor belt to the articles, approaches the remaining individual package rows separately. At the conclusion of the application, when all label rows of a feeding advance have been applied, the labeling unit can be returned to its starting point. In the meanwhile, the packaging lanes carry out the next format advance. The conveyor belt takes up a new row of labels from the dispenser and the transferring cycle commences once more. Because of the distance covered by the labeling unit over the packaging lanes, the length of such labeling machines is appreciable due to the safety distances that must be maintained. In addition, large masses must be moved at high speed. This is disadvantageous for mechanical reasons. In this connection, the laying of the electrical cables is a further problem and accessibility to the moving parts becomes more difficult. The high hygiene requirements, which must be fulfilled by labeling machines involved in packaging food, are a further difficulty. In this connection, the use of exhaust ventilators with a high air throughput is disadvantageous in every case. Moreover, an automated, rapid and thorough cleaning of the suction box is desirable, but not readily possible.

SUMMARY OF THE INVENTION

It is therefore an object of the present invention to provide a labeling method of the type mentioned above, as well as an appropriate device, which makes a high labeling output possible, while avoiding the problems named above, which arise with the known labelers. In particular, it is the intention to do without exhaust ventilators, which have a high throughput of air. Moreover, those difficulties are to be avoided, which occur when a labeling unit with multi-row article lanes is operated, such as large moving masses, limited accessibility and connecting problems, as well as the long length of the labeling machine. Finally, it shall basically be possible to clean the inventive labeling device largely automatically without any problems.

For the inventive device, the labels initially are transferred in consecutive rows from the conveyor belt to a section of a transfer belt, which extends from the conveyor belt over and beyond the article path. The rows of labels are placed consecutively onto this section, until a set with a specified number of rows is completed. During an advance of the lanes, the transfer belt is driven to dispense the set of label rows, already held thereon, onto the articles.

This method offers the advantage that, in one working cycle, in which the lanes are advanced, several of labels are transferred simultaneously from the transfer belt to the articles. A high labeling output becomes possible by these means without having to operate a labeling unit with large moving masses relative to the packing machine. Rather, the conveyor belt, the driving unit of the transfer belt and the label dispenser, which is disposed next to the lanes, remain stationary with respect to the running direction of the lanes. By these means, the desired advantages of a more compact construction, an improved accessibility as well as lower moving masses are achieved. All the connecting leads necessary can be installed without any problems. Maintenance and operational reliability are improved appreciably by doing without a vacuum suction unit. In particular, automatic cleaning in a simpler manner is also possible, so that use in areas where the hygienic requirements are higher is also not a problem.

BRIEF DESCRIPTION OF THE DRAWINGS

A preferred example of the invention is explained in greater detail in the following by means of an example.

DETAILED DESCRIPTION

Figure 1:
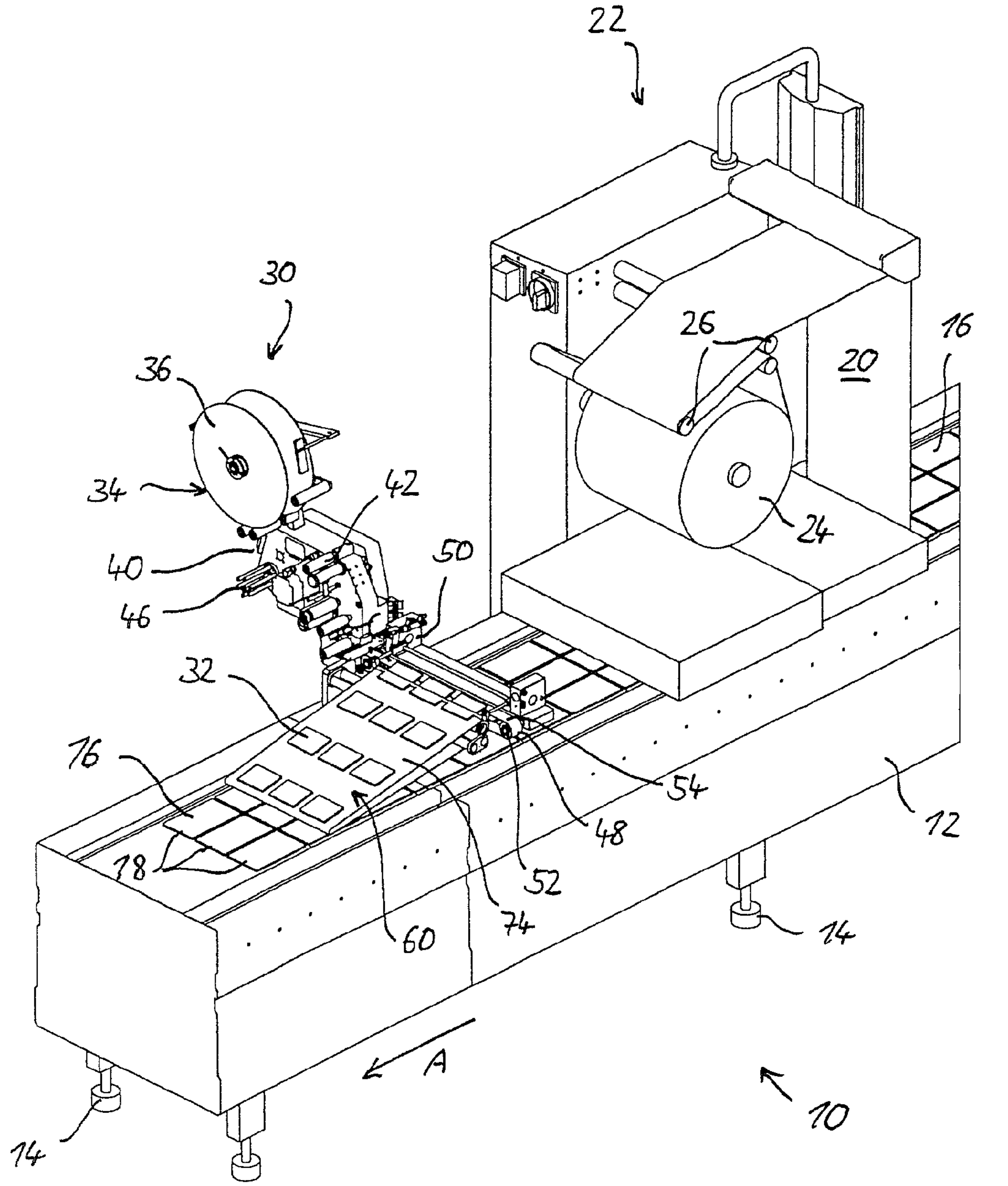
FIG. 1 is a perspective view of a first embodiment of a labeling device for carrying out the inventive method.
Figure 2:
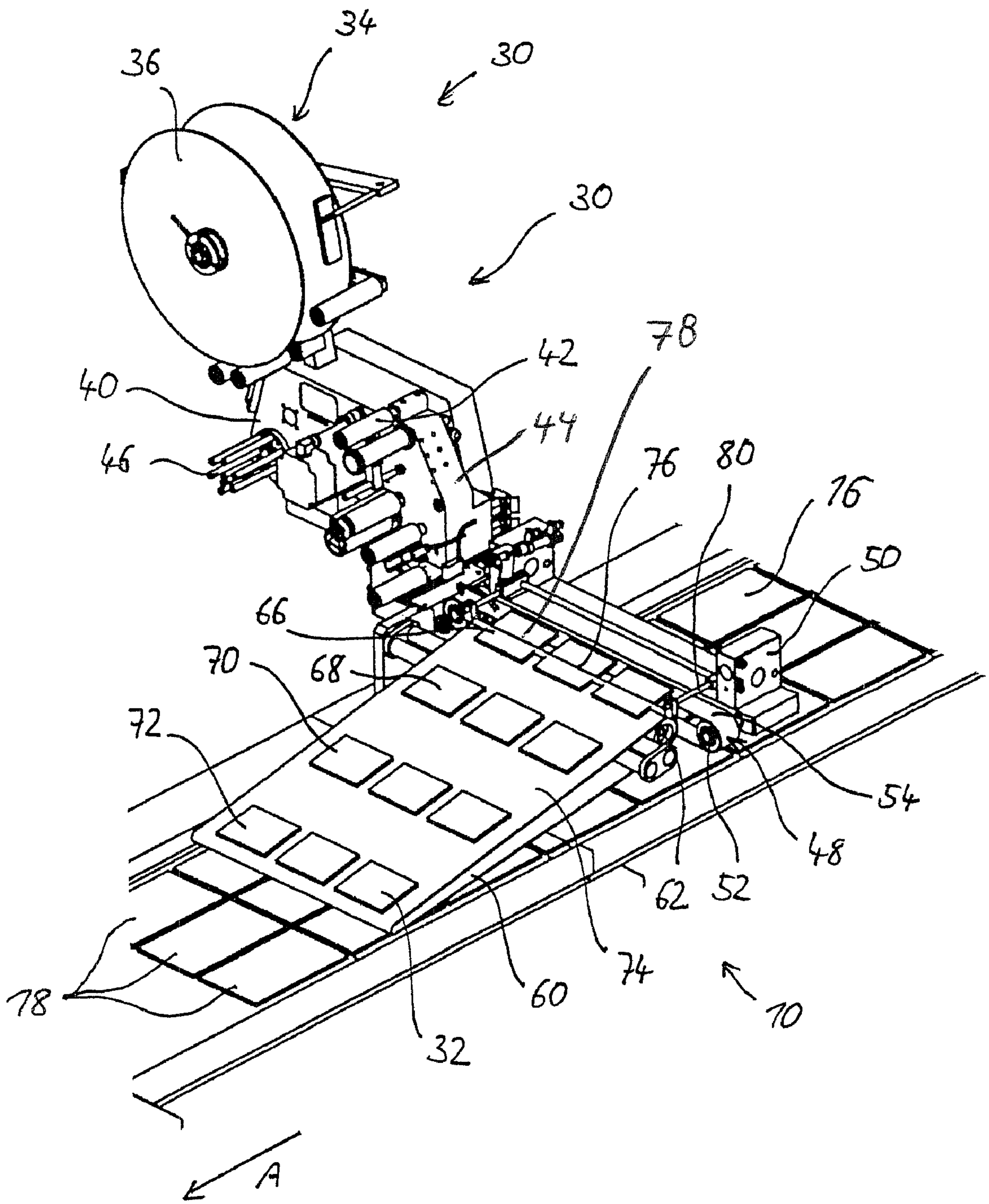
FIG. 2 is a detailed view of FIG. 1.
Figure 3:
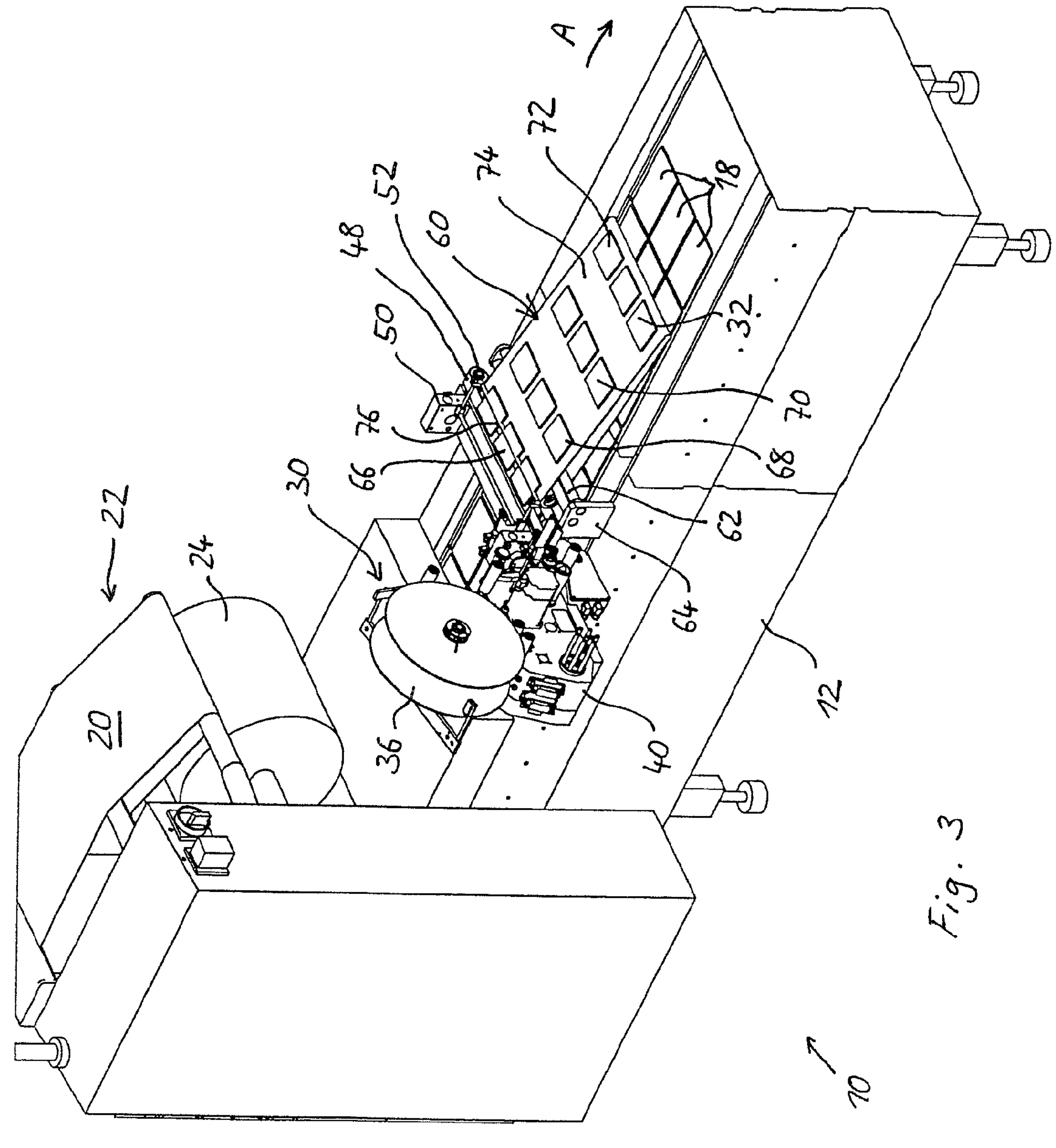
FIG. 3 is a further perspective view of the labeling device of FIGS. 1 and 2.
Figure 4:
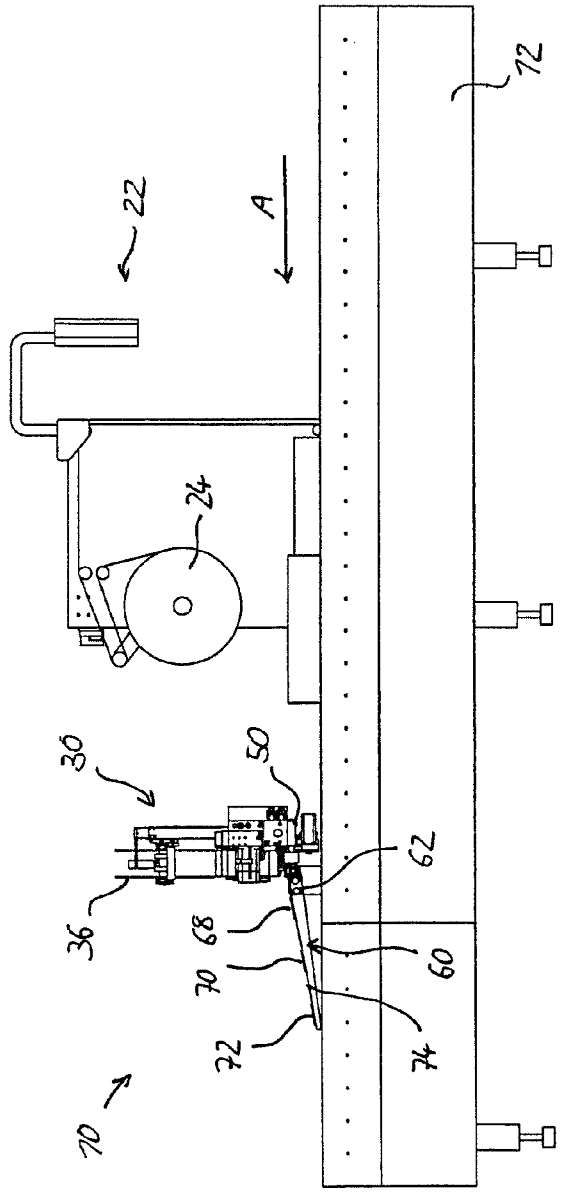
FIG. 4 is a side view of the labeling device of FIGS. 1 to 3.
Figure 5:
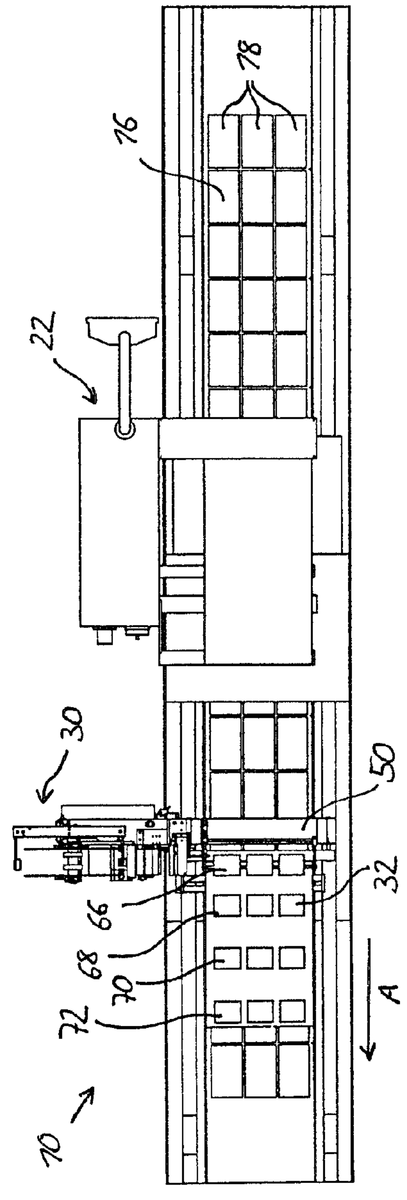
FIG. 5 is a plan view of the labeling device of FIGS. 1 to 4 and FIG. 6 is a front view of the labeling device of FIGS. 1 to 5.
Figure 6:
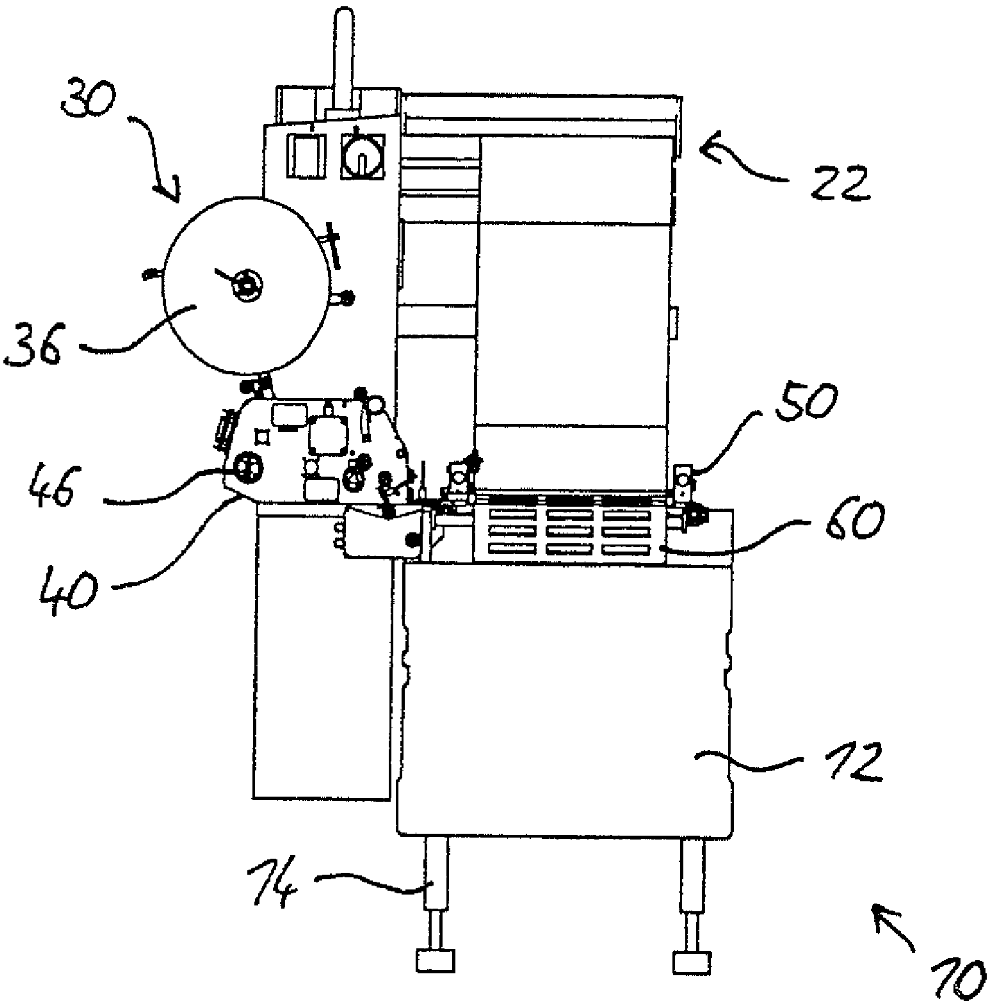

The labeling device 10, shown in FIGS. 1 to 6, comprises a machine frame 12, which rests on legs 14 and in which articles 16, such as thermoformed packages or the like are transported in parallel lanes 18 in a longitudinal direction A of the machine frame 12. Three lanes 18 of articles 16 can be identified in the Figures. The articles hang together due to the packing film mounted at their upper side to close them off, so that the articles 16 form a composite. The packing film 20 is applied by a unit 22, which comprises a packing film dispensing roll 24, guide rollers 26, as well as further parts, which are not visible in the Figures and are intended for unwinding the film 20 from the dispensing roll 24 and welding it to the articles 16. This unit 22, as such, is known and not an object of the present invention.

A labeling unit 30 is disposed downstream from the unit 22 for applying and welding the packing film 20 and applies labels 32 on the free upper side of the articles 16, which are provided with the packing film 20. The labeling unit 30 comprises a label dispenser 34, which is disposed at the side of the lanes 18, with a supply roll 36 of labels, which is carried at an arm protruding laterally from the machine frame 12 and labeled generally with the reference number 40. This arm 40 furthermore carries a number of guide rollers 42, over which a backing film 44, carrying the labels from the supply roll 36, is passed, as well as a reel 46, on which the empty backing film is wound after the labels have been dispensed from it. For reasons of clarity, the backing film 44 is not shown in greater detail in the Figures. The design of the label dispenser 34 is also known as such.

The label dispenser 34 dispenses the individual labels 32 consecutively from their backing film 44. This is accomplished in a known manner owing to the fact that the backing film runs over a dispensing edge. The respective label 32 is detached from the backing film 44 here and taken up by a conveyor belt, which extends transversely over the lanes 18 at right angles to the advancing direction A. The conveyor belt 48 is an endless belt, which is passed over two rollers, which are mounted at the ends of a bridge 50 and spans the lanes 18 in the transverse direction. This bridge 50 furthermore contains means for driving at least one of the two rollers 52 for transporting the conveyor belt 48. The axes of rotation of these two rollers 52 are horizontal and the conveyor belt 48 is aligned so that its carrying run is averted from the lanes 18 and, on its upper side, can take up the labels, which were dispensed by the label dispenser 34.

The conveyor belt 48 is able to take up three labels 32 in a row next to one another on its carrying run 54 and moreover, in such a manner that, in each case, a free end of the label 32 protrudes over the longitudinal edge of the conveyor belt 48 that is downstream in the advancing direction A of the lanes 18. A transfer device, which is generally labeled 56 and comprises a transfer belt 60, which also is constructed as an endless belt, transfers the labels 32, which are kept in readiness on the conveyor belt, to the articles 16. In a region, which is upstream with respect to the advancing direction A of the lanes 18 and is in the vicinity of the bridge 50, which carries the conveyor belt 48, the transfer belt 60 is supported on a roller 62, which is held on one side at an arm 64, which is disposed at the side of the machine frame 12 next to the label dispenser 34. This arm 64 holds the roller 62 at one of its ends at a distance above the lanes 18. At a downstream end, the transfer belt 60 runs over a dispensing edge, the details of which are not shown and which is disposed directly above the upper side of the article 16, which are to be labeled.

As is to be described in even greater detail in the following the labels 32, which are made ready by the conveyor belt 48 in the manner described above, are applied in consecutive rows 66, 68, 70, 72 on the carrying run 74 of the transfer belt 60. This carrying run 74, which extends from the conveyor belt 48 over the lanes 18 in the transporting direction A of the latter up to the upper side of the lanes 18, accordingly represents a section 74 of the transfer belt 60 for accommodating the labels 32. This section 74 of the transfer belt is inclined slightly downwards in the feeding direction A starting out from the conveyor belt 48 and encloses an acute angle with the lanes 18.

The mode of operation of the labeling device 10, shown in FIGS. 1 to 6, is to be described in greater detail in the following.

For making available a row 66, 68, 70, 72 of labels 32, the conveyor belt 48 is driven in such a manner, that its carrying run 54 moves away from the label dispenser 34 and, with that, the individual labels 32 are dispensed by the label dispenser consecutively at intervals on the conveyor belt 48, until the row is completed. In the arrangement shown in the Figures, each row 66, 68, 70, 72 comprises three labels 32, which correspond to the number of parallel lanes 18 of articles 16.

Once the row of labels 32 has been deposited completely on the conveyor belt 48, the latter is stopped and a pusher 76 pushes the ends of the labels, protruding laterally beyond the conveyor belt 48, down onto the transfer belt 60. As is known, for example from German patent 26 47 556, such a pusher 76 is formed by a cross bar 78, which is held between two lever arms 80, which start out from the bridge 50, which carries the conveyor belt 48. The cross bar 78 of the pusher 76 extends parallel to the downstream edge of the conveyor belt 48 in such a manner, that it takes hold of the free ends of the labels 32 adhering thereto as the lever arms 80 are depressed and can press these down.

If, after the free ends of the upper row 66 of the labels 32 are depressed, the transfer belt 60 is advanced by a specified amount in the advancing direction A of the lanes 18, the transfer belt 60 pulls the pressed labels 32 in this direction, so that they are detached completely from the conveyor belt 48. This transporting path corresponds to the distance between the pushing position, in which the uppermost row 66 is in the Figures, and the position of the next downstream row 68.

After the label 32 is pulled off, the upper end of the carrying run 54 of the conveyor belt 48 is ready to accept a new row of three labels 32. This row 66 is completed in the manner already described above, that is, by dispensing individual labels 32 consecutively from the label dispenser 34 and taking up these labels during an advance of the conveyor belt 48. Accordingly, after it is made available, a row of labels is pulled off with the help of the pusher 76 and the cyclic driving mechanism of the transfer belt 60 and transported further, so that a new row can be made available.

Four rows 66, 68, 70, 72 of labels 32 are deposited consecutively on the carrying run 74 of the transfer belt 80 by this cyclic operation of the transfer belt 60. These four rows 66, 68, 70, 72 form a set, which is dispensed on the articles 16 during a subsequent advance of the lanes 18. For this purpose, the transfer belt 60 may be advanced synchronously with the lanes 18. During this advance, the labels 32 on the transfer belt 60 traverse the dispenser edge, are peeled off from the surface of the transfer belt 60 and adhere to the upper side of the articles. This advancing motion of the lanes 18 and of the transfer belt 60 takes place until the set of four lanes 66, 68, 70, 72, which is deposited on the carrying run 74 of the transfer belt 60 has been dispensed on the lanes 18.

This mode of operation enables several consecutive rows 66, 68, 70, 72 of labels 32 to be dispensed during a single advancing cycle of the lanes 16. The labeling device 10 can be operated in such a manner, that the lanes 18 are advanced intermittently and, during pauses in this advance, a set of label rows 66, 68, 70, 72 on the section 74 on the upper side of the transfer belt 60, which is intended for this purpose, is completed in four working cycles.

The whole of the labeling unit 30 of label dispenser 34, bridge 50 with conveyor belt 48 and arrangement for holding the transfer belt 60 remains stationary over the path, over which the lanes 18 run. In contrast to the prior art, a back and forth movement of the labeling unit 30 in the advancing direction A is not required. Therefore, no path has to be planned for this when designing the machine and the labeling device 10 can de configured more compactly. Further advantages arise owing to the fact that labeling device 10 can be handled, maintained and cleaned more easily. It can be operated without an exhaust ventilator, so that appreciable advantages arise from the point of view of hygiene.

The method described is also conceivable in an alternative embodiment for labeling the packaging lanes 18 from below. For this variation, the components of the labeling unit 30 described would be disposed correspondingly below the packaging lanes 18 in the machine frame 12 of the packaging machine.

What is claimed is:

1. A method for the multi-lane and multi-row application of labels on articles, which are guided in parallel lanes, said method comprising the steps of:

dispensing the labels from a backing film by a label dispenser, which is disposed at a side of the lanes;

taking up the dispensed labels by a conveyor belt, which is guided transversely over the lanes; and transferring the labels by a transfer device from the conveyor belt onto the articles, said step of transferring including the steps of:

transferring the labels in consecutive rows from the conveyor belt to a section of a transfer belt, which extends transversely to the conveyor belt over and beyond the lanes, until a set with a specified number of label rows on the transfer belt section is completed; and driving the transfer belt, during an advance of the lanes, so as to dispense the set of label rows onto the articles;

wherein the set of label rows includes multiple label rows that each include multiple labels, and the driving step is performed such that the entire set of label rows is dispensed onto the articles during a single advancing cycle of the lanes.

2. The method of claim 1, wherein said step of driving, during the dispensing of the set of label rows from the transfer belt onto the articles, drives the transfer belt synchronously with driving of the articles.

3. The method of claim 1, wherein, for arranging a set of label rows, the step of transferring the labels in consecutive rows comprises driving the transfer belt cyclically, with one cycle comprising the transfer of a row of labels, which is already placed on the conveyor belt onto the transfer belt and advance of the transfer belt in a direction of the lanes.

4. The method of claim 3, wherein after a row of labels is transferred from the conveyor belt to the transfer belt, the step of transferring the labels in consecutive rows further comprises advancing the conveyor belt for making available a new row of labels, which are to be transferred.

5. A device for implementing the method of claim 1, comprising:

a label dispenser for dispensing labels;

a conveyor belt which leads transversely over lanes of articles and is provided to accommodate dispensed labels from the label dispenser; and a transfer device for transferring the labels from the conveyor belt to the articles, said transfer device comprising a transfer belt, which has a section for accommodating the labels, which extends transversely to the conveyor belt over and beyond the lanes.

6. The device of claim 5, wherein the transfer belt is constructed as an endless belt having a carrying run which forms a transfer belt section for accommodating the labels.

7. The device of claim 6, wherein an end of the transfer belt section, pointing to the lanes, is passed over a dispensing edge.

8. The device of claim 6, wherein the transfer belt section for accommodating the labels is disposed inclined downward in a direction of the lanes and forms an acute angle with the lanes.

9. The device of claim 5, wherein the transfer device has a pusher for depressing a row of labels, made available on the conveyor belt, onto the transfer belt.

10. The method of claim 1, wherein the multiple label rows of the set of label rows include at least four label rows.

11. The method of claim 1, wherein the entire conveyor belt is positioned above the lanes.

12. The method of claim 1, wherein the entire transfer belt is positioned above the lanes.

13. The device of claim 5, wherein the entire conveyor belt is positioned above the lanes.

14. The device of claim 5, wherein the entire transfer belt is positioned above the lanes.

* * * * *

UNITED STATES PATENT AND TRADEMARK OFFICE

CERTIFICATE OF CORRECTION

PATENT NO. : 8,113,257 B2
APPLICATION NO. : 12/053777
DATED : February 14, 2012
INVENTOR(S) : Georg Austermeier It is certified that error appears in the above-identified patent and that said Letters Patent is hereby corrected as shown below:

On the Cover of the Patent:

Delete:
(73) Assignee: Mulivac Marking & Inspection GmbH & Co. KG (DE)

and insert:

(73) Assignee: Multivac Marking & Inspection GmbH & Co. KG (DE)

Signed and Sealed this
Twenty-fifth Day of September, 2012

David J. Kappos
*Director of the United States Patent and Trademark Office*